United States Patent [19]

Matsuzaki

[11] 4,270,634
[45] Jun. 2, 1981

[54] AUTOMATIC/MANUAL ADJUSTER FOR DRUM BRAKE

[75] Inventor: Takashi Matsuzaki, Tokyo, Japan

[73] Assignee: Akebono Brake Industry Co. Ltd., Tokyo, Japan

[21] Appl. No.: 94,897

[22] Filed: Nov. 16, 1979

[30] Foreign Application Priority Data

Nov. 24, 1978 [JP] Japan ............................ 53-161656[U]

[51] Int. Cl.³ .............................................. F16D 65/40
[52] U.S. Cl. .......................... 188/196 M; 188/79.5 S; 188/196 BA
[58] Field of Search ....... 188/79.5 S, 196 M, 196 BA, 188/325, 362, 363, 364; 192/111 A

[56] References Cited

U.S. PATENT DOCUMENTS

| 2,733,781 | 2/1956 | Brisson | 188/196 BA |
| 3,068,964 | 12/1962 | Williams et al. | 188/79.5 S |
| 3,227,247 | 1/1966 | Sherretts et al. | 188/196 BA |
| 3,570,632 | 3/1971 | Williams | 188/196 M |

Primary Examiner—Jeffrey V. Nase
Attorney, Agent, or Firm—Toren, McGeady and Stanger

[57] ABSTRACT

An automatic adjuster which readily permits manual adjustment of a drum brake by manually rotating an adjuster screw only. For normal automatic adjustment, an adjuster nut makes outward screwing rotation with the adjuster screw not allowed to rotate when the extent of forward movement of the adjuster nut comes to exceed a predetermined value during brake application. Manual adjustment is performed by rotating the adjuster screw to screw it outward or inward while the adjuster nut is not allowed to rotate.

6 Claims, 8 Drawing Figures

AUTOMATIC/MANUAL ADJUSTER FOR DRUM BRAKE

BACKGROUND OF THE INVENTION

1. Field of the Invention

This invention relates to an automatic/manual adjuster for a drum brake.

2. Description of the Prior Art

In an automatic adjuster of this type used for a conventional wedge brake as shown in FIG. 1 of the accompanying drawings, an adjuster nut 5 is concentrically disposed within a piston 4 which is caused to non-rotatively move in the axial direction within a cylinder 2 by the operation of a wedge mechanism with the adjuster nut 5 being arranged to be rotatable and to be movable together with the piston 4. This adjuster nut 5 has an adjuster screw 7 attached thereto by screwing. Further, there is provided a lever 9 which is pivotally connected to a body 3 of the cylinder 2. A claw part 10 which is formed at the fore end of the lever 9 is caused by the spring force of a spring 11 to resiliently engage ratchet teeth formed on the outer circumference of the adjuster nut 5.

The operation of the conventional automatic adjuster is such that, during brake application, the adjuster nut 5 and the adjuster screw 7 which is screwed to the adjuster nut 5 move forward together as the piston 4 moves forward in the direction of an arrow shown in FIG. 1. Accordingly, a brake shoe 8 comes into pressed contact with a drum, which is not shown, and there develops a braking force. Then, the forward movement of the adjuster nut 5 which takes place as the piston 4 moves forward sways the claw part 10 of the lever 9 which is in resilient engagement with one of ratchet teeth 6. The degree of the sway of the claw part 10 gradually increases as the degree of the wear of the lining of the brake shoe 8 increases. The engaging end of the claw part 10 comes to deflect to a greater extent in the circumferential direction of the ratchet teeth 6 according as its swaying extent increases and, if it skips one tooth, it engages with the next tooth. When the brake is released under this condition, the brake shoe 8 is urged by the spring force of a return spring, which is not shown, to return to its initial position while pushing the piston 4. However, the return swing of the lever 9 then causes the adjuster nut 5 to rotate by one tooth. With the adjuster nut 5 thus rotated in the direction of b as shown in FIG. 1, the nut 5 is screwed outward. The adjuster nut 5 and the piston 4 are thus arranged always to return to their initial positions. However, the returning positions at which the adjuster screw 7 and the brake shoe 8 are redetermined are closer toward the drum as much as the relative displacement in the axial direction caused by the rotation of the adjuster nut 5. In this manner, an automatic adjusting action is performed by the outward screwing rotation of the adjuster nut 5 which takes place according as the wear of the lining of the brake shoe 8 increases.

The conventional automatic adjuster which is capable of performing an automatic adjusting operation presents a problem that it virtually prohibits manual adjustment of a clearance between the brake shoe and the drum as desired. To make the manual adjustment, the adjuster screw 7 is rotated to screw it outward in the direction a as shown in FIG. 1 to engage the brake shoe 8 with the drum. Following that, the screw 7 is rotated in the direction of b to a certain given angle and is thus returned to a predetermined extent to have a prescribed clearance between the brake shoe and the drum. However, during the process of returning the screw 7, the frictional force of the screw part causes the nut 5 also to rotate in the same direction of b to hinder the manual adjustment work. This is because the lever 9 does not function to prohibit the nut 5 from rotating in the direction b.

SUMMARY OF THE INVENTION

It is a general object of this invention to provide an automatic adjuster which readily permits manual adjustment of a drum brake by manually rotating an adjuster screw only.

In accordance with this invention, a normal automatic adjusting action is performed by the outward screwing rotation of an adjuster nut while the adjuster screw is not allowed to rotate when the extent of forward movement of the adjuster nut comes to exceed a predetermined value during brake application. On the other hand, the manual adjustment is performed by rotating the adjuster screw to screw it outward or inward while the adjuster nut is not allowed to rotate.

The above and further objects, features and advantages of the invention will become apparent from the following detailed description of embodiments thereof taken in connection with the accompanying drawings.

DETAILED DESCRIPTION OF PREFERRED EMBODIMENTS

Figure 1:
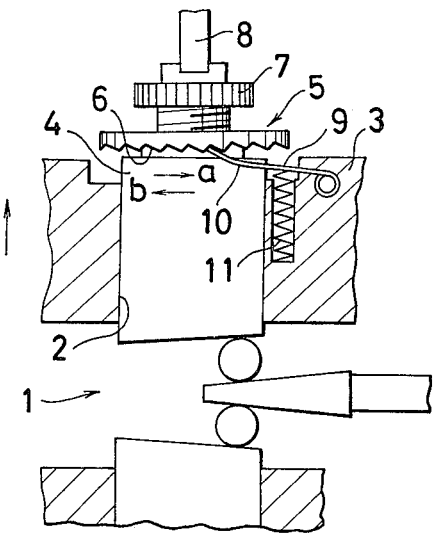
FIG. 1 is a partly sectional view showing by way of example a conventional adjuster device applied to a wedge brake.
Figure 2A:
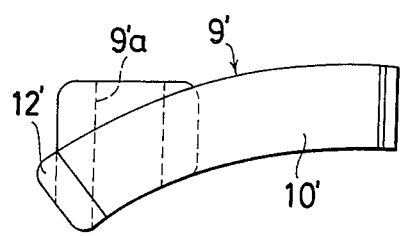
FIG. 2(A) being a plan view and FIG. 2(B) a front view thereof.
Figure 2B:
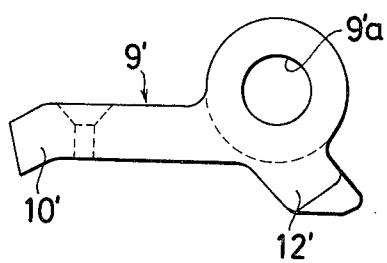
FIG. 2 shows a lever of an adjuster as embodiment example of the invention.

Referring to FIGS. 2(A) and (B) which show an embodiment example of the invention, a lever 9' which has a claw part 10' at one end thereof is provided with an auxiliary claw part 12', which is shorter than the claw part 10' and is disposed at the opposite end of the lever 9'. The middle part of the lever 9' is pivotally connected to the body 3 of the cylinder 2 through an opening 9' a provided in the middle part. This auxiliary claw part 12' is arranged to restrict the rotation of the adjuster nut 5 in the direction b shown in FIG. 1.

Figure 3A:
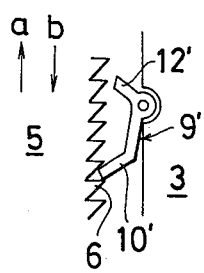
FIGS. 3(A), (B) and (C) are detail views showing the operation of the embodiment of the invention.

Referring now to FIGS. 3(A), (B) and (C) which show the operation of an automatic adjuster using the lever 9' of the invention, the spring 11 and other parts shown in FIG. 1 are omitted in FIG. 3 for the sake of illustration.

FIG. 3(A) shows the lever 9' as in a posture under a non-braking condition. The claw part 10' of the lever 9' is caused by the spring force of the spring 11 to be in resilient engagement with the ratchet teeth 6 to restrict the rotation of the adjuster nut 5 in the direction a.

Figure 3B:
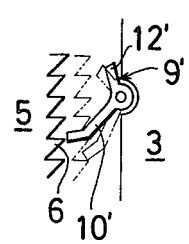

FIG. 3(B) shows an automatic adjusting action, wherein the swaying move of the lever 9' due to movement of adjuster nut 5 during brake application causes the claw part 10' to override one of the ratchet teeth 6; and a return swaying move of the lever 9' which takes place when the brake is released causes the adjuster nut 5 to make outward screwing rotation.

Figure 3C:
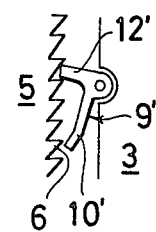

FIG. 3(C) shows the lever 9' as in a posture which obtains when the adjuster screw 7 is operated to move it in the direction b during a manual adjusting operation. In this case, the ratchet teeth 6 are rotated according as the screw 7 rotates. The rotation of the ratchet teeth 6 causes the lever 9' to sway counterclockwise and the claw part 10' is in turn caused to move away from the teeth 6. Then, the auxiliary claw part 12' which is arranged as second claw part comes closer to the ratchet teeth 6. Further rotation of the ratchet teeth 6 causes the auxiliary claw part 12' to engage with the ratchet teeth 6 and the rotation of the nut 5 is restricted by the engagement of the claw part 12'. The adjuster nut 5 is thus prohibited by the lever 9' from making both outward and inward screwing rotations when the adjuster screw 7 is manually rotated.

Figure 4:
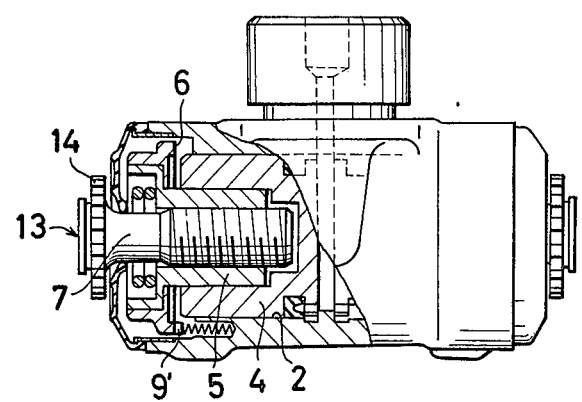
FIG. 4 is a partly sectional view showing a hydraulic operated drum brake as another embodiment example of the invention.
Figure 5:
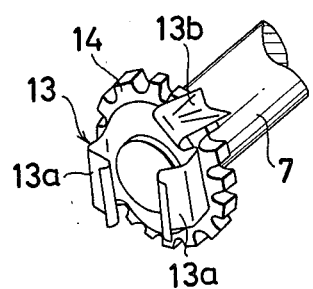
FIG. 5 is an oblique view showing an adjuster screw employed in the embodiment shown in FIG. 4.

In FIGS. 4 and 5, another embodiment example shows that the automatic/manual adjuster of the present invention is applicable also to a drum brake of a hydraulic operation type. In this embodiment, an opening provided in the middle part of a resilient plate 13 is arranged to engage with one end of the adjuster screw 7 which engages the brake shoe 8. The resilient plate 13 is provided with a pair of arms 13a and is prevented from rotating with the pair of arms 13a arranged to have the brake shoe 8 interposed in between them. The resilient plate 13 is further provided with a spring part 13b, which is in resilient contact with the gear 14 of the adjuster screw 7 to prevent the screw 7 from being caused to rotate by vibration that takes place while the vehicle is running. The spring part 13b also serves to let a worker feel the rotation of the adjuster screw 7 during a manual adjustment operation.

A further advantage attainable by providing the lever 9' with the second claw part 12' is as follows: During brake application, the adjuster nut 5 also moves when the piston 4 moves and the lever 9' sways clockwise. However, the swaying move of the lever 9' is limited to an extent corresponding to a distance to an adjoining tooth of the teeth 6 with the claw part 12' coming in contact with the body 3 of the cylinder 2. Accordingly, even when the piston moves to an extent exceeding a predetermined value, the extent to which the brake clearance is adjusted is limited to one pitch of the ratchet teeth 6. This prevents over-adjustment even if the piston 4 comes to move to an increased extent when the inner diameter of the drum is enlarged by the heat of the brake. Whereas, in the case of the example of the conventional automatic adjuster shown in FIG. 1, the extent of movement of the lever 9 increases when the piston 4 moves to an excessible extent and the adjustment nut 5 tends to be rotated to an extent corresponding to several pitches of the ratchet teeth 6. Thus the conventional automatic adjuster tends to perform over-adjustment.

As described in the foregoing, the invented automatic/manual adjuster for a drum brake not only satisfactorily permits easy manual adjustment but also is arranged to effectively prevent over-adjustment by a very simple improvement made by just changing the shape of the conventionally employed lever.

What is claimed is:

1. An automatic/manual adjuster for a drum brake comprising:
    a body;
    a piston which is disposed within said body and is slidably arranged to push a brake shoe against a drum;
    an adjuster nut which is rotatable within said piston and is arranged to be movable together with said piston, said adjuster nut being provided with teeth which are formed on the outer circumferential part of the adjuster nut;
    an adjuster screw which is screwed to said adjuster nut and has one end thereof engaged with said brake shoe;
    a lever having a middle part which is pivotally connected to said body;
    a spring means arranged to engage said teeth with a first claw part provided at one end of the lever; and
    a second claw part arranged at the other end of said lever to come to engage with said teeth when said first claw part is disengaged from said teeth by a swaying movement of said lever.

2. An automatic/manual adjuster according to claim 1, wherein said second claw part is shorter than the first claw part.

3. An automatic/manual adjuster according to claim 1, wherein the extent of the swaying movement of said lever caused by said spring means when said piston moves is limited to a predetermined extent by the engagement of said second claw part with said body.

4. An automatic/manual adjuster according to claim 3, wherein said predetermined extent corresponds to one pitch of said teeth.

5. An automatic/manual adjuster according to claim 1, wherein a spring member which is formed in a plate shape and is connected at one end of said adjuster screw is resiliently in contact with a gear of said adjuster screw.

6. An automatic/manual adjuster according to claim 5, wherein said spring member is provided with an opening and a pair of arms; said opening engages one end of said adjuster screw; and said pair of arms have said brake shoe interposed in between them to prevent said spring member from rotating.

* * * * *